(12) United States Patent
Cheng

(10) Patent No.: US 11,717,911 B1
(45) Date of Patent: Aug. 8, 2023

(54) METHOD OF FUSING METAL OBJECTS TOGETHER

(71) Applicant: Paul Po Cheng, London (CA)

(72) Inventor: Paul Po Cheng, London (CA)

(*) Notice: Subject to any disclaimer, the term of this patent is extended or adjusted under 35 U.S.C. 154(b) by 0 days.

(21) Appl. No.: 17/500,442

(22) Filed: Oct. 13, 2021

Related U.S. Application Data

(60) Provisional application No. 63/104,185, filed on Oct. 22, 2020.

(51) Int. Cl.
| | | |
|---|---|---|
| *B23K 20/12* | (2006.01) | |
| *B23K 20/00* | (2006.01) | |
| B23K 101/10 | (2006.01) | |

(52) U.S. Cl.
CPC ............ *B23K 20/002* (2013.01); *B23K 20/12* (2013.01); *B23K 2101/10* (2018.08)

(58) Field of Classification Search
CPC .............. B23K 20/002; B23K 2101/10; B23K 20/12–1215; B29C 65/08
USPC ............. 228/112.1–114.5, 2.1–2.3; 156/73.5
See application file for complete search history.

(56) References Cited

U.S. PATENT DOCUMENTS

| | | | | |
|---|---|---|---|---|
| 3,269,002 | A * | 8/1966 | Hollander | B23K 20/12 228/113 |
| 3,819,339 | A * | 6/1974 | Takagi | B23K 20/121 228/114.5 |
| 4,331,280 | A * | 5/1982 | Terabayashi | B23K 20/12 228/114.5 |
| 4,542,846 | A * | 9/1985 | Matsui | F16L 58/181 228/114.5 |
| 4,756,465 | A * | 7/1988 | Pranch | B23K 20/129 228/115 |
| 4,944,977 | A * | 7/1990 | Shantz | B29C 65/0672 428/35.8 |
| 5,752,725 | A * | 5/1998 | El-Sobky | B29C 66/5229 228/114.5 |
| 6,637,642 | B1 * | 10/2003 | Lingnau | B23K 20/12 219/601 |
| 6,880,743 | B1 * | 4/2005 | Coletta | B23K 20/1295 228/2.1 |
| 7,348,523 | B2 | 3/2008 | Slack et al. | |
| 7,931,184 | B2 * | 4/2011 | Lingnau | B23K 20/12 228/2.1 |

(Continued)

FOREIGN PATENT DOCUMENTS

| | | | | |
|---|---|---|---|---|
| CN | 101484266 | A * | 7/2009 | ............ B23K 20/12 |
| CN | 107052562 | A * | 8/2017 | |

(Continued)

*Primary Examiner* — Kiley S Stoner

(57) ABSTRACT

A method of fusing first and second metal objects together at respective first and second ends thereof, the first and second ends being partially defined by respective first and second end walls thereof. One or more recesses is formed in one or both of the first and second ends. The ends are heated to a hot working temperature in an inert atmosphere, and the first and second end walls are engaged with each other, to form one or more deformed parts of the first and second ends. While the first and second end walls are engaged, one or more objects is rotated around its axis, to squeeze the one or more deformed parts into the one or more recesses respectively. The first and second metal objects are allowed to cool, to fuse the first and second metal objects together at the first and second ends.

3 Claims, 8 Drawing Sheets

(56) References Cited

U.S. PATENT DOCUMENTS

| | | | | |
|---|---|---|---|---|
| 9,644,769 B1 | * | 5/2017 | Cheng | B23K 20/12 |
| 2013/0064672 A1 | * | 3/2013 | Izadi | B23K 20/12 416/223 R |
| 2015/0336203 A1 | * | 11/2015 | Zhai | B29C 65/06 228/2.1 |
| 2016/0039043 A1 | * | 2/2016 | Bray | B23K 20/12 228/2.1 |
| 2021/0095771 A1 | * | 4/2021 | Endrich | F16K 11/07 |
| 2021/0291293 A1 | | 9/2021 | Cheng | |

FOREIGN PATENT DOCUMENTS

| | | | | | |
|---|---|---|---|---|---|
| CN | 107420049 A | * | 12/2017 | | B23K 20/12 |
| CN | 107461158 A | * | 12/2017 | | B23K 20/12 |
| CN | 113967784 A | * | 1/2022 | | |
| CN | 113967785 A | * | 1/2022 | | |
| DE | 4436016 A1 | * | 4/1996 | | F17C 13/06 |
| DE | 102006021044 A1 | * | 11/2007 | | B23K 20/12 |
| DE | 102008007541 A1 | * | 8/2009 | | B23K 20/12 |
| DE | 102011000544 A1 | * | 8/2012 | | B23K 20/12 |
| DE | 112014000490 T5 | * | 11/2015 | | B23K 20/12 |
| DE | 112018007369 T5 | * | 12/2020 | | B23K 20/12 |
| GB | 1323678 A | * | 7/1973 | | B23K 20/12 |
| JP | 03243286 A | * | 10/1991 | | |
| JP | 04131225 A | * | 5/1992 | | B29C 65/0672 |
| JP | 06106366 A | * | 4/1994 | | |
| JP | 2003019574 A | * | 1/2003 | | |
| JP | 2004042049 A | * | 2/2004 | | B23K 20/126 |
| JP | 3809010 B2 | * | 8/2006 | | B23K 20/12 |
| KR | 20140091405 A | * | 7/2014 | | |
| KR | 101641961 B1 | * | 7/2016 | | |
| RU | 2705833 C2 | * | 11/2019 | | |
| WO | WO-9415137 A1 | * | 7/1994 | | B29C 65/0672 |
| WO | WO-2006061203 A1 | * | 6/2006 | | B21J 5/066 |
| WO | WO-2014152842 A2 | * | 9/2014 | | B23K 20/129 |
| WO | WO-2015147041 A1 | * | 10/2015 | | B23K 20/12 |

* cited by examiner

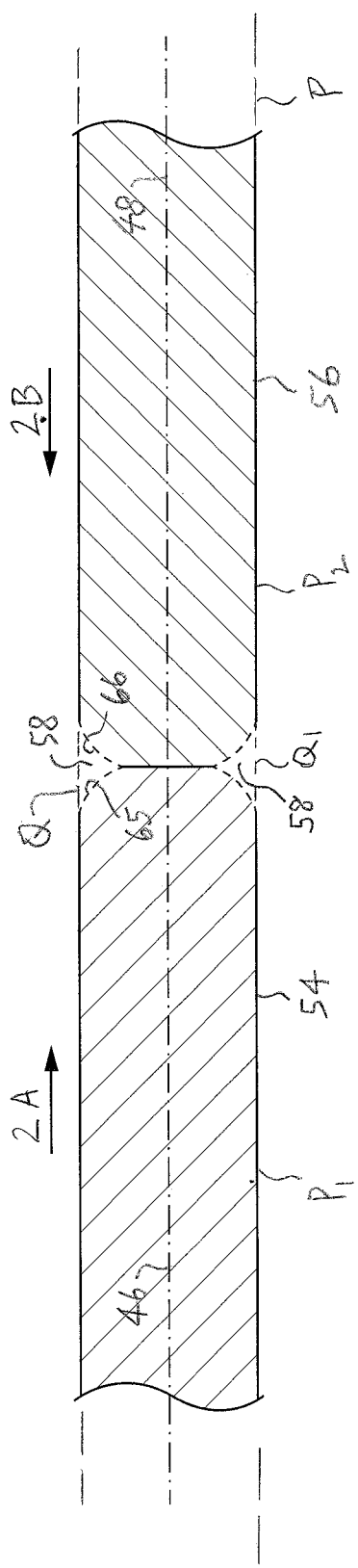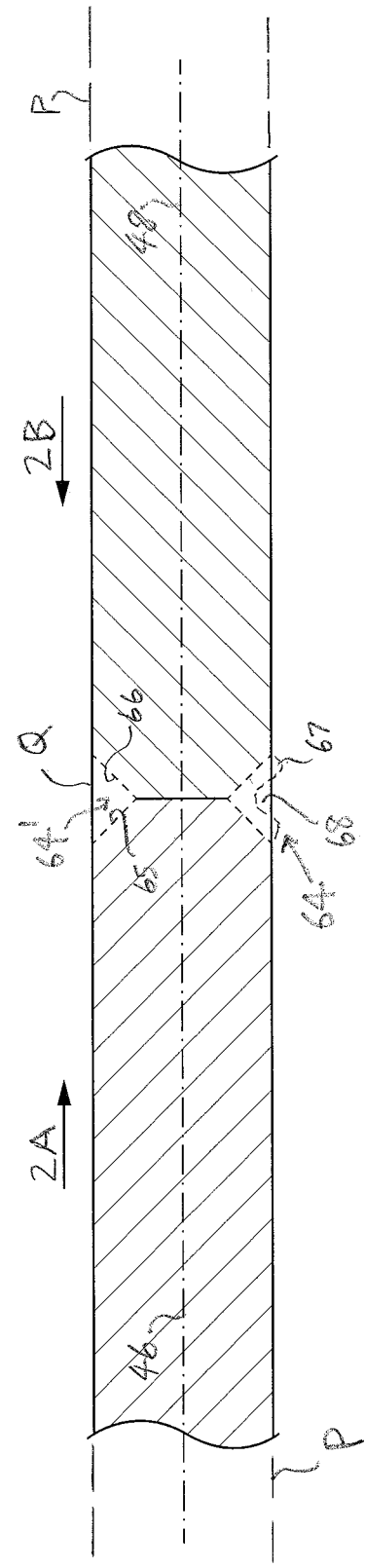
FIG. 3A
FIG. 3B

METHOD OF FUSING METAL OBJECTS TOGETHER

CROSS-REFERENCE TO RELATED APPLICATION

This application claims the benefit of U.S. Provisional Application No. 63/104,185, filed on Oct. 22, 2020, and incorporates herein such provisional application in its entirety by reference.

FIELD OF THE INVENTION

The present invention is a method of fusing objects together in which recesses are formed in one or more of the objects to receive metal therefrom deformed when the objects are fused together.

BACKGROUND OF THE INVENTION

Methods of fusing metal objects together are known, e.g., methods of fusing pipe together, as disclosed in U.S. Pat. No. 6,637,642. However, as illustrated in FIG. 1, when pipes 10, 12 are joined together using the methods of the prior art, relatively large amounts of the joined pipes form protrusions 14, 16.

As illustrated in FIG. 1, the protrusion 14 extends into a cavity 17 at least partially defined by inner walls 18, 20 of the pipes 10, 12. The protrusion 14 is partially defined by a line "$X_1$", which is aligned with the inner walls 18, 20. As is well known in the art, the protrusion 14 may be unacceptable, due to its interference with the flow of a fluid or a fluid-solid mixture through cavity formed by the joined pipes, e.g., the protrusion may cause an unacceptable amount of turbulence, or the protrusion may interfere with the movement of a "pig" through the pipe.

Similarly, the protrusion 16 extends beyond the external walls 22, 24 of the pipes 10, 12, and depending on the manner in which the joined pipes are to be used, the protrusion 16 may also be unacceptable. In FIG. 1, the protrusion 16 is partially defined by a line "$X_2$" that is aligned with the external walls 22, 24.

As is well known in the art, the protrusions 14, 16 result from the compression of respective ends 26, 28 of the pipes 10, 12 that are joined together. Before the pipes 10, 12 are joined together, their respective axes "$Y_1$", "$Y_2$" are aligned. To join the pipes 10, 12 together, the ends 26, 28 are heated to a hot working temperature, one or both of the pipes are rotated relative to the other, and the ends 26, 28 are pressed against each other. The pipes 10, 12 are forced against each other (while one or both of the pipes is rotating), in the directions indicated by arrows "A" and "B" in FIG. 1. As the ends 26, 28 of the aligned pipes 10, 12 are pushed against each other, one or both of the pipes 10, 12 is rotated about its axis relative to the other pipe.

As a result, typically, an inner part 30 of the end 26 is pushed outwardly, and an inner part 32 of the end 28 is also pushed outwardly, to form the protrusion 14. Similarly, an outer part 34 of the end 26 is pushed outwardly, and an outer part 36 of the end 28 is pushed outwardly, to form the protrusion 16. As is well known in the art, the effect is due to each of the first and second objects 10, 12 being somewhat shortened when they are compressed together, because portions of the ends 26, 28 are forced outwardly (i.e., away from the axes "$Y_1$", "$Y_2$") because the ends are at the hot working temperature, and subjected to significant compressive forces.

As is also well known in the art, further work that is required to remove the protrusions 14, 16 is time-consuming, and may be difficult to achieve. In particular, access to the protrusion 14 to remove it may be difficult, or simply not practicable.

SUMMARY OF THE INVENTION

For the foregoing reasons, there is a need for a method of fusing metal objects together that overcomes or mitigates one or more of the deficiencies or disadvantages of the prior art.

In its broad aspect, the invention provides a method of fusing first and second metal objects together. The first and second objects have respective first and second ends which are heated to a hot working temperature, in an inert atmosphere, by a heating element located therebetween. The heating element is removed, and the objects are rotated about their respective axes and then the first and second ends are engaged. One or more recesses are formed in the first and second ends.

When the first and second ends are engaged with each other, while each are at or approximately at the hot working temperature, one or more deformed parts are formed from the first and second ends. The recess is formed to receive the deformed part(s).

In one of its aspects, the invention provides the step of modifying the deformed part to form a smooth joint at the first and second ends, so that aligned side walls of the first and second objects and the smooth joint form uninterrupted surfaces.

BRIEF DESCRIPTION OF THE DRAWINGS

The invention will be better understood with reference to the attached drawings, in which:

FIG. 3A is a cross-section of the first and second metal objects of FIG. 2 showing the first and second ends thereof engaged with each other, the first and second objects being compressed against each other;

FIG. 3B is a cross-section of first and second metal objects joined together at their respective first and second ends with the first and second side walls defining continuous planes;

DETAILED DESCRIPTION

Figure 1:
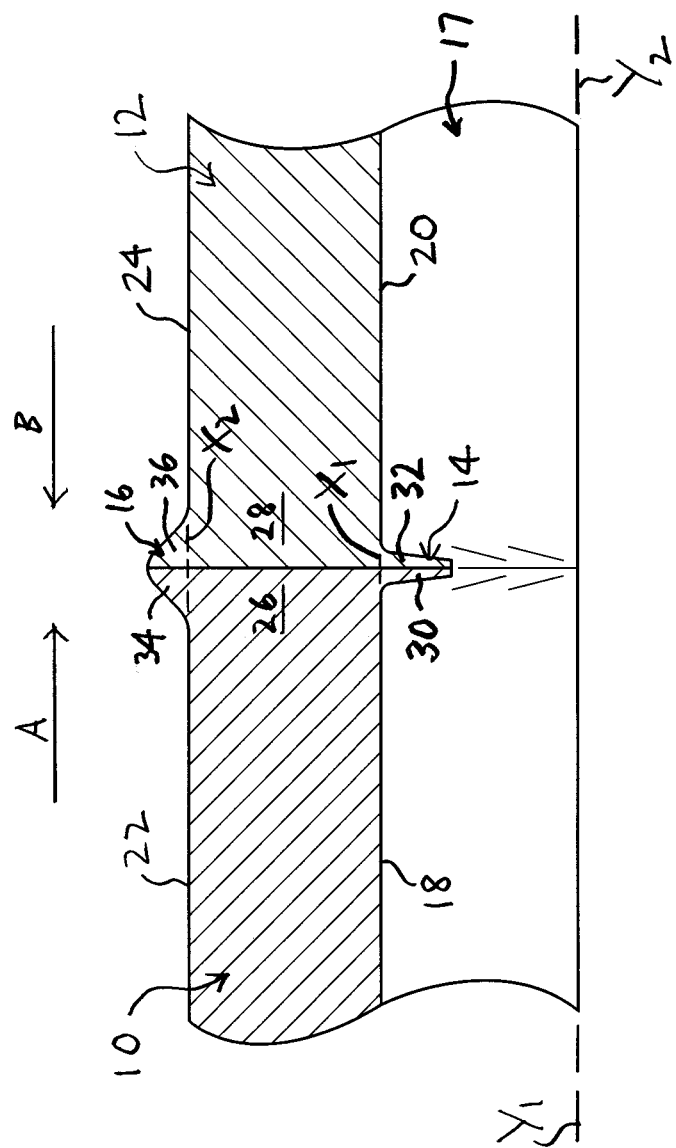
FIG. 1 (previously described) is a cross-section of a portion of pipes joined together according to a method of the prior art.
Figure 2:
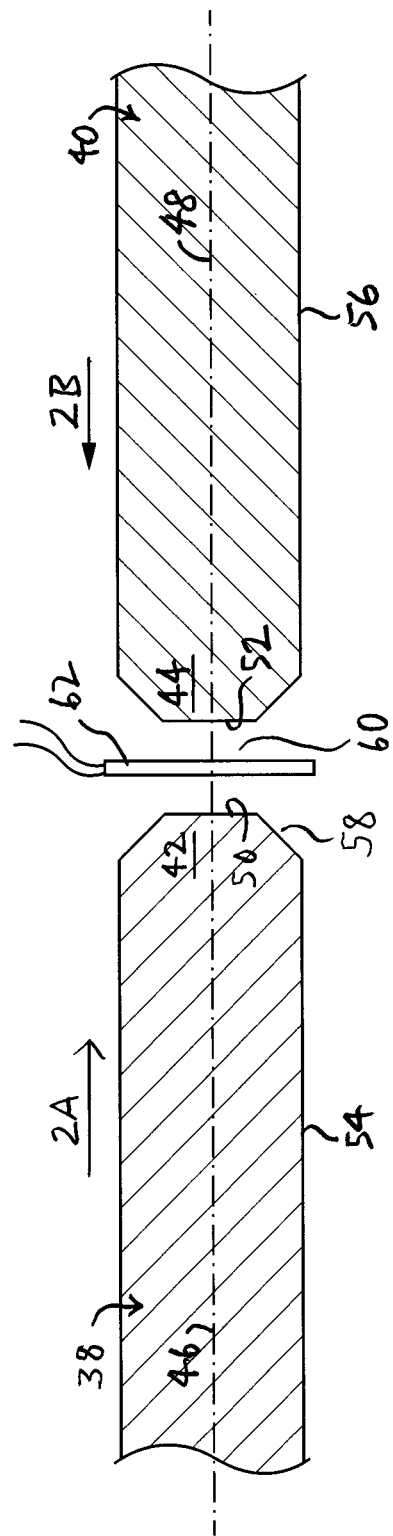
FIG. 2 is a cross-section of first and second metal objects formed in accordance with an embodiment of the invention, spaced apart from each other to define a gap between respective first and second ends thereof.

In the attached drawings, like reference numerals designate corresponding elements throughout. Reference is first made to FIGS. 2-3B to describe an embodiment of a method in accordance with the invention.

The invention includes an embodiment of a method of fusing first and second metal objects 38, 40 together at respective first and second ends 42, 44 thereof, the first and second objects 38, 40 being defined by respective first and second axes 46, 48 thereof. The first and second ends 42, 44 are partially defined by respective first and second end walls 50, 52 thereof. The first metal object 38 includes one or more first side walls 54 that are transverse to the first end wall 50, and the second metal object 40 includes one or more second side walls 56 that are transverse to the second end wall 52. In one embodiment, the method preferably includes forming one or more recesses 58 in one or more of the first and second ends 42, 44, as will be described.

It is also preferred that the first side wall 54 and the second side wall 56 are aligned, as illustrated in FIG. 2. As shown in FIG. 2, when the first side wall 54 and the second side wall 56 are aligned, the respective axes 46, 48 are also aligned.

While the first side wall 54 and the second side wall 56 are aligned, the first and second objects 38, 40 are located relative to each other to space the first and second ends 42, 44 apart from each other, to define a gap 60 therebetween. It is preferred that an inert (i.e., non-oxidizing) atmosphere is provided, enveloping the first and second ends. Preferably, one or more heating elements 62 are located in the gap 60. The heating element 62 is energized, to heat the first and second ends 42, 44 to a hot working temperature, at which the metal of the first and second ends is subject to plastic deformation. The heating element 62 is then removed from the gap 60.

While the first and second ends 42, 44 are at the hot working temperature, the first and second end walls 50, 52 are engaged with each other under compression, to form at least one deformed part 64 of the first and second ends 42, 44 (FIG. 3B). As can be seen in FIGS. 3A, and 3B the first and second objects 38, 40 preferably are pushed in the directions indicated by arrows "2A", "2B", against each other. It will be understood that, alternatively, only one of the objects 38, 40 may be moved, while the other object is stationary. Also, while the first and second end walls 50, 52 are engaged, one or both of the first and second objects 38, 40 are rotated about their respective axes 46, 48, resulting in the deformed part 64 being squeezed at least partially into the recess 58.

The first and second metal objects 38, 40 are then permitted to cool, to fuse the first and second metal objects 38, 40 together at the first and second ends 42, 44.

Preferably, the recess 58 is formed to receive the deformed part 64, so that the deformed part 64 generally may fill the recess 58. As will be described, in one embodiment, the recess 58 preferably is formed to receive all of the deformed part 64, and the deformed part 64 preferably has the same volume, or approximately the same volume, as the recess 58.

The shape and size of the recess 58 may vary, depending on a number of parameters, e.g., the metal of which the first and second objects 38, 40 are made. It will be understood that the characteristics of the metal may affect the design of the recess 58, i.e., its size and shape.

The objects 38, 40 illustrated in FIGS. 2 and 3A-3B are exemplary. As illustrated, the objects 38, 40 may be, for example, metal rods, with generally circular cross-sections. However, as will be described, the objects to be joined together may have any suitable shape.

As can be seen in FIG. 3A, the recess 58 preferably is partly defined by a line "Q" that is aligned with a plane "P" that is defined by the first and second side walls 54, 56 after the first and second metal objects 38, 40 have been fused together. For example, as illustrated in FIG. 3B, after the first and second objects 38, 40 are fused together, the recess 58 is defined by surfaces 65, 66 on the ends 42, 44, and the line "Q".

It will be understood that the surfaces 65, 66 may be formed in any suitable manner. For instance, the surfaces 65, 66 may be straight (planar), concave, convex, or may include steps or cavities formed therein, or the surfaces 65, 66 may include combinations thereof. Those skilled in the art would also appreciate that the dimensions of the surfaces 65, 66 may vary.

It will be understood that, for clarity of illustration, the deformed part 64 is omitted from FIG. 3A. As can be seen in FIG. 3B, in practice, although the deformed part 64 preferably has sufficient volume to fill the recess 58, may not fill the recess 58 completely in some parts thereof, and may overfill the recess 58 in other parts. For example, in FIG. 3B, the deformed part 64 as illustrated includes portions 67 that extend beyond the line "Q", and also define a cavity 68 that remains unfilled, in the recess 58.

Those skilled in the art would appreciate that, although the portions 67 and the cavity 68 may be acceptable in some applications, in many applications, either the portions 67 or the cavity 68 would not be acceptable. Ideally, however, the recess 58 is filled by the deformed part 64, as illustrated in FIG. 3A.

As an example of the result that is intended to be achieved, in FIG. 3A, it can be seen that, after the first and second objects 38, 40 have been fused together, the first and second side walls 54, 56 of the first and second metal objects 38, 40 preferably define continuous planes, identified for convenience in FIG. 3A as "$P_1$" and "$P_2$". Preferably, the recess 58 is formed so that the deformed part(s) 64 resulting from the heating, compression, and rotation of the objects 38, 40 fill the recess 58. That is, it is preferred that the amount of material that is deformed is sufficient to fill the recess 58, but only to the extent that an exterior face "$Q_1$" of the deformed part 64 is formed that is aligned with the side walls 54, 56, to define "P". The deformed part 64' in FIG. 3B represents the ideal situation, in which the recess 58 has been filled by the deformed part 64', i.e., without any portion of the deformed part 64 being pushed outside the recess 58.

Those skilled in the art would appreciate that, as a practical matter, the ideal result represented by the deformed part 64' may be difficult to achieve. However, those skilled in the art would also appreciate that, in practice, it may be possible to approximate the ideal result illustrated in FIG. 3B by the deformed part 64', by forming the recess 58 so that the deformed part substantially fills the recess 58 as the objects 38, 40 are fused together.

Figure 4:
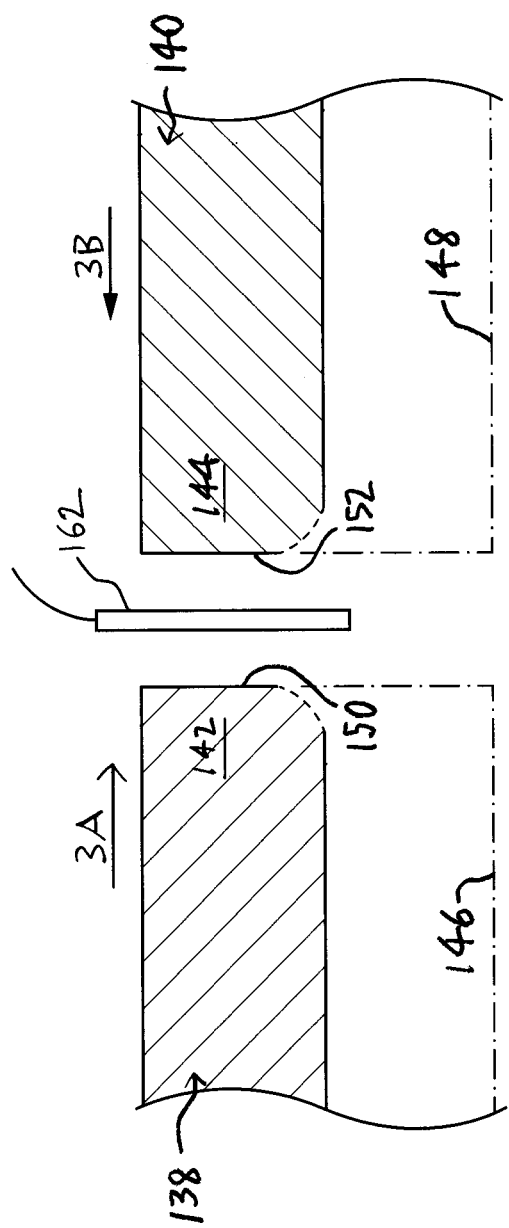
FIG. 4 is a cross-section of first and second metal objects formed in accordance with an alternative embodiment of the invention, spaced apart from each other to define a gap between first and second ends thereof, in which a heating element is positioned.
Figure 5A:
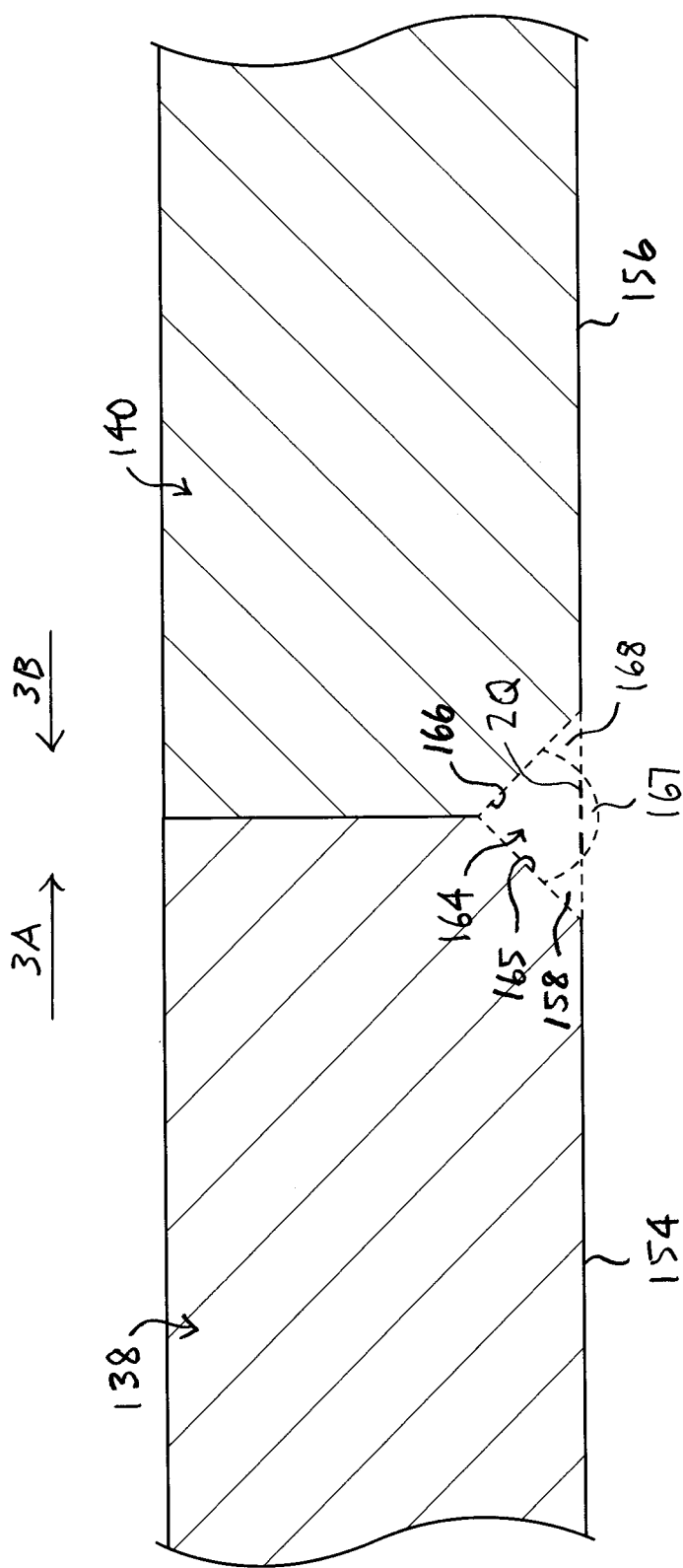
FIG. 5A is a cross-section of the first and second metal objects of FIG. 4 showing the first and second ends thereof engaged with each other, the first and second objects being compressed against each other, with a deformed part extending partially beyond a plane defined by side walls of the first and second objects.
Figure 5B:
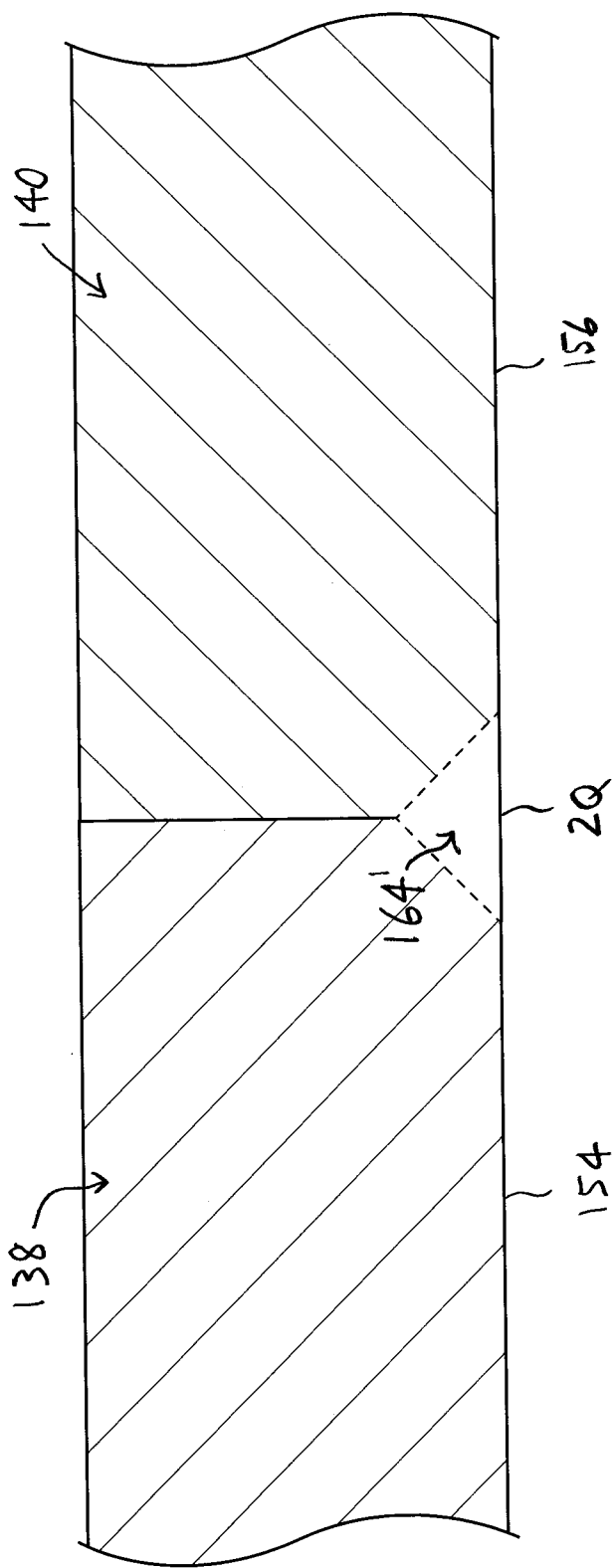
FIG. 5B is a cross-section of the first and second objects of FIG. 5A, showing the deformed part located in the recess.
Figure 5C:
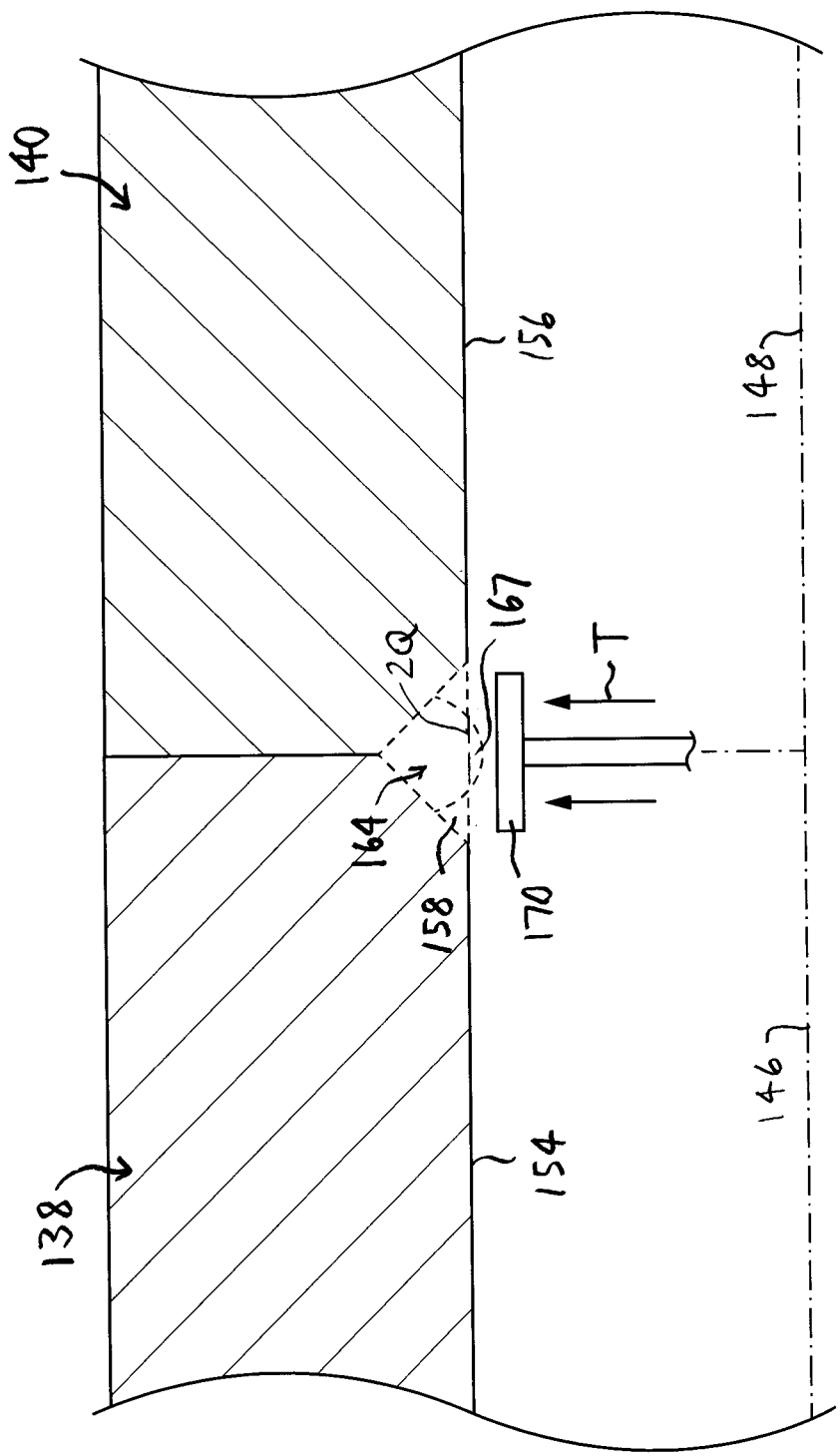
FIG. 5C is a cross-section of the first and second objects of FIG. 5B and an element for modifying the deformed part of the first and second ends.
Figure 5D:
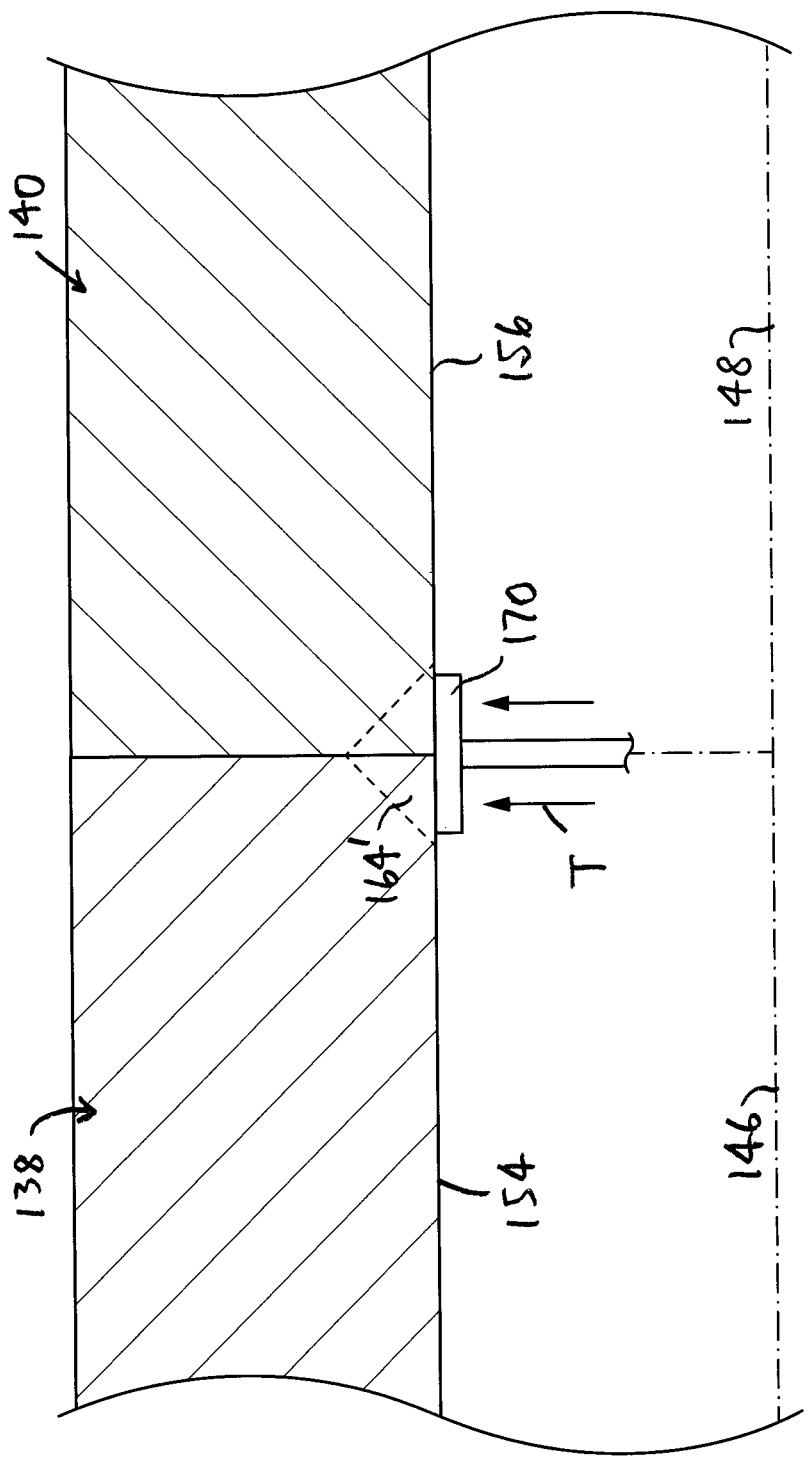
FIG. 5D is a cross-section of the first and second objects of FIG. 5C showing the element engaged with the first and second ends thereof.

In another alternative embodiment of the invention, illustrated in FIGS. 4-5D, a first metal object 138 and a second metal object 140 are fused together, as illustrated in FIGS. 4 and 5D. As will be described, it is preferred that, immediately after the first and second ends 142, 144 have been engaged with each other, the first and second ends 142, 144 are engaged by a smoothing element 170 (FIG. 5C).

It will be understood that the element 170 engages the first and second ends 142, 144 while they are at, or substantially at, the hot working temperature. The element 170 may be used where at least a portion 167 of the deformed part 164 extends beyond the line identified in FIGS. 5A and 5C as "2Q" (FIG. 5A). As can be seen in FIGS. 5A-5C, the line "2Q" is aligned with the inner first and second side walls 154, 156 of the objects 138, 140 respectively.

The object 138, 140 may be, for example, pipe. As illustrated in FIGS. 5A and 5C, the objects define a recess 158 at the inner side walls 154, 156. In the example illustrated in FIGS. 5A-5D, there is no recess at the outer side walls of the objects 138, 140. It will be understood that only one wall of each of the objects 138, 140 is illustrated, and the other walls thereof are omitted, for clarity of illustration.

As described above, first, the heating element 162 is energized, to heat the first and second ends 142, 144 to the hot working temperature. Once the first and second ends 142, 144 are at the hot working temperature, one or both of the objects 138, 140 is rotated about their respective axes 146, 148, and the first and second ends 142 are pressed against each other (i.e., the first and second end walls 150, 152 are pushed against each other), while one or both of the first and second objects 138, 140 are rotated about their respective axes 146, 148. The directions in which the first and second objects 138 are pushed against each other are indicated by arrows "3A" and "3B" (FIGS. 4, 5A).

As described above, when the first and second ends 142, 144 are heated to the hot working temperature and then engaged with each other, and rotated while engaged, some portions of the ends 142, 144 are pushed into the recess 158. As noted above, such portions are referred to as the deformed part 164 of the first and second ends 142, 144.

It will be understood that the recess 158 has been formed so that the deformed part 164 preferably has a volume that is sufficient to fill the recess 158. It is also preferred that the volume of the deformed part 164, is not to exceed the volume of the recess 158.

In FIG. 5A, the surfaces of the first and second ends 142, 144 that partially define the recess 158 are identified by reference numerals 165, 166 for convenience. It will be understood that, as illustrated in FIG. 5A, the volume of the recess 158 is partially defined by the surfaces 165, 166 and the line "2Q".

In summary, ideally, because the volume of the deformed part 164 is determined to be approximately the same as the volume of the recess 158, the volume as partially defined by the surfaces 165, 166 and the line "2Q" preferably is filled by the deformed part 164.

However, those skilled in the art would appreciate that, due to the process used to fuse the first and second objects 138, 140 together, the deformed part 164 may not be entirely positioned as preferred, i.e., a portion (not shown) of the deformed part 164 may be pushed outwardly, past the line "2Q".

For example, in FIG. 5A, the portion of the deformed part 164 that extends beyond the line "2Q" is identified by reference numeral 167. As illustrated in FIG. 5A, because some of the deformed part 164 is positioned outside the line "2Q", a cavity 168 is also formed, inside the line "2Q", i.e., inside the recess 158. It will be understood that, in practice, although the deformed part 164 has the same volume as the recess 158, the deformed part 164 is not necessarily entirely positioned in the recess 158, once the first and second objects 138, 140 have become fused together.

The deformed part 164', shown in FIG. 5B, represents the deformed part when it fills the recess 158, and does not extend beyond the line "2Q". As illustrated in FIGS. 5C and 5D, the element 170 is formed to push any portion 167 of the deformed part 164 that extends outwardly past the line "2Q" into any cavity 168 remaining at that time (i.e., shortly after the objects 138, 140 are fused together), so that the deformed part 164' formed thereby fills the recess 158, and does not extend beyond the line "2Q".

Those skilled in the art would appreciate that the portion 167 may only be pushed into position (i.e., into the recess 158, to partially align with the line "2Q") while the portion 167 is at the hot working temperature, or at a temperature closely approximating the hot working temperature. Accordingly, the element 170 is to be engaged with the portion 167, if any, shortly after the objects 138, 140 are fused together, and while the portion 167 is at the hot working temperature, or a temperature that closely approximates the hot working temperature.

As shown in FIG. 5C, the element 170 preferably is directed against the first and second ends 142, 144 in a direction "T" that is generally transverse to the first and second axes 146, 148, to push the portion 167 back into the recess 158, to provide the formed deformed part 164'.

In one embodiment, the element 170 preferably is heated to a suitable temperature (e.g., approximately the hot working temperature), so that upon engagement of the element 170 with the portion 167, heat may be transferred from the element 170 to the portion 167.

As described above, the embodiments of the method of the invention described herein may be utilized where metal objects of any overall shape or configuration are to be joined together. For example, the metal objects that include the recesses to receive the deformed parts of the metal objects may be rods, pipes, sheets (flat and curved), or any other forms of objects.

It will be appreciated by those skilled in the art that the sequence of certain of the steps of the embodiments of the method of the invention may be varied, and methods including such variations are within the scope of the embodiments of the invention disclosed herein. For example, the first and second metal objects may be located relative to each other prior to aligning the first and second metal objects with each other.

It will also be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A method of fusing first and second metal pipes together at respective first and second ends thereof, the first and second pipes being defined by respective first and second axes thereof, the first and second ends being partially defined by respective first and second end walls thereof, the first metal pipe including at least one first inner side wall that is transverse to the first end wall and the second metal pipe including at least one second inner side wall that is transverse to the second end wall, the method comprising:

(a) forming surfaces at the first and second ends extending to the first and second inner side walls respectively, to define a recess relative to the first and second inner side walls when the first and second ends are engaged with each other;
(b) aligning the first and second pipes with each other;
(c) while said at least one first inner side wall and said at least one second inner side wall are aligned, and while the first and second axes are aligned, locating the first and second pipes relative to each other to space the first and second ends apart from each other, to define a gap therebetween;
(d) providing an inert atmosphere in the gap that envelopes the first and second ends;
(e) locating at least one heating element in the gap;
(f) energizing said at least one heating element, to heat the first and second ends to a hot working temperature;
(g) removing said at least one heating element from the gap;
(h) while the first and second ends are at the hot working temperature, engaging the first and second end walls with each other under compression, to form at least one deformed part of the first and second ends;
(i) while the first and second end walls are engaged, rotating at least one of the first and second pipes around the axis thereof, wherein said at least one deformed part is at least partially received in the recess;
(j) upon a portion of said at least one deformed part extending from the recess beyond a plane defined by the first and second inner walls, pushing said portion of said at least one deformed part into the recess, to form at least one smooth joint at the first and second ends, wherein the aligned first and second inner side walls are uninterrupted at the first and second ends; and
(k) permitting the first and second pipes to cool, to fuse the first and second pipes together at the first and second ends.

2. The method according to claim 1 in which said portion of said at least one deformed part is pushed into the recess by a face of an element until the face is aligned with the first and second inner walls.

3. The method according to claim 2 additionally including heating the element to the hot working temperature for heat transfer from the element to the portion of said at least one deformed part.

* * * * *